US011160716B2

(12) United States Patent
Belanger-Desbiens et al.

(10) Patent No.: US 11,160,716 B2
(45) Date of Patent: Nov. 2, 2021

(54) EXOSKELETON STRUCTURE

(71) Applicants: SAFRAN ELECTRONICS & DEFENSE, Boulogne-Billancourt (FR); B-TEMIA INC., Québec (CA)

(72) Inventors: Alexandre Belanger-Desbiens, Québec (CA); Francisco Soucy, Québec (CA); Sylvain Gagne, Québec (CA); Nathaniel Zoso, Québec (CA); Jordane Grenier, Boulogne-Billancourt (FR)

(73) Assignees: SAFRAN ELECTRONICS & DEFENSE, Boulogne-Billancourt (FR); B-TEMIA INC., Quebec (CA)

( * ) Notice: Subject to any disclaimer, the term of this patent is extended or adjusted under 35 U.S.C. 154(b) by 0 days.

(21) Appl. No.: 16/958,367

(22) PCT Filed: Dec. 28, 2018

(86) PCT No.: PCT/EP2018/097084
§ 371 (c)(1),
(2) Date: Jun. 26, 2020

(87) PCT Pub. No.: WO2019/129855
PCT Pub. Date: Jul. 4, 2019

(65) Prior Publication Data
US 2021/0052459 A1      Feb. 25, 2021

(30) Foreign Application Priority Data

Dec. 28, 2017    (FR) ...................................... 1763302

(51) Int. Cl.
*A61H 3/00*         (2006.01)
*B25J 9/00*         (2006.01)

(52) U.S. Cl.
CPC .............. *A61H 3/00* (2013.01); *B25J 9/0006* (2013.01); *A61H 2003/007* (2013.01);
(Continued)

(58) Field of Classification Search
CPC .............. A61H 3/00; A61H 2201/1642; A61H 2201/1652; A61H 2201/1626; A61H 2201/1628; A61H 2003/007; B25J 9/0006
(Continued)

(56) References Cited

U.S. PATENT DOCUMENTS 3,358,678 A     12/1967  Kultsar
7,628,766 B1 *  12/2009  Kazerooni ................ A61F 5/00
                                                        602/16
(Continued)

FOREIGN PATENT DOCUMENTS

CN       106112989 A      11/2016
DE       102016104200 A1  12/2016
FR       3018680 A1        9/2015

OTHER PUBLICATIONS

French Search Report dated Nov. 20, 2018 for French Application No. 1763302.
(Continued)

*Primary Examiner* — Justine R Yu
*Assistant Examiner* — Kelsey E Baller
(74) *Attorney, Agent, or Firm* — Sughrue Mion, PLLC

(57) ABSTRACT

An exoskeleton structure includes a pelvis assembly, a first lower limb assembly, a second lower limb assembly and a back assembly. The exoskeleton structure includes pivot joints connecting each of the lower limb assemblies and the back assembly to the pelvis assembly and permitting movements of abduction or adduction of the lower limbs of the user, a relative movement of lateral inclination of the spine of the user with respect to the pelvis of the user, and a twisting movement of the spine.

17 Claims, 7 Drawing Sheets

Figure 1:
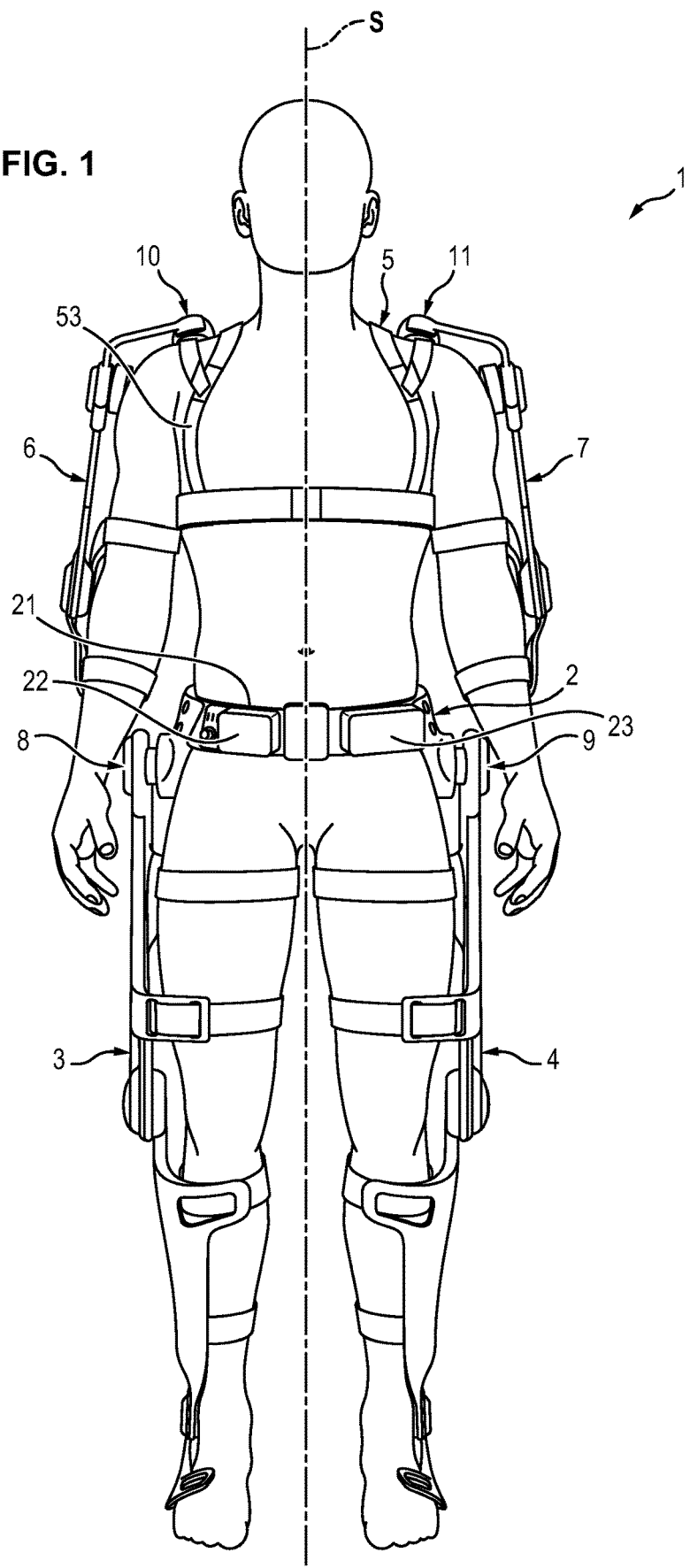

(52) U.S. Cl.
CPC ............... *A61H 2201/1626* (2013.01); *A61H 2201/1628* (2013.01); *A61H 2201/1642* (2013.01); *A61H 2201/1652* (2013.01)

(58) Field of Classification Search
USPC ................... 602/19, 20; 601/5; 700/245–264
See application file for complete search history.

(56) References Cited

U.S. PATENT DOCUMENTS

| | | | | |
|---|---|---|---|---|
| 10,548,800 | B1* | 2/2020 | Barnes | A63B 21/0004 |
| 10,639,784 | B2* | 5/2020 | Grenier | B25J 19/005 |
| 2012/0184880 | A1* | 7/2012 | Doyle | A61F 5/0118 |
| | | | | 601/33 |
| 2013/0303950 | A1* | 11/2013 | Angold | A61H 3/00 |
| | | | | 601/35 |
| 2016/0339583 | A1* | 11/2016 | Engelhoven | B25H 1/10 |
| 2017/0181917 | A1* | 6/2017 | Ohta | A61H 1/0244 |
| 2019/0344429 | A1* | 11/2019 | Grenier | B25J 9/0006 |
| 2020/0229960 | A1* | 7/2020 | Romo | A61F 5/0123 |

OTHER PUBLICATIONS

International Search Report dated Aug. 4, 2019 for International Application No. PCT/EP2018/097084.

* cited by examiner

EXOSKELETON STRUCTURE

CROSS REFERENCE TO RELATED APPLICATIONS

This application is a National Stage of International Application No. PCT/EP2018/097084, filed Dec. 28, 2018, claiming priority to French Patent Application No. 1763302, filed Dec. 28, 2017, the entire contents of each of which are incorporated by reference herein in their entireties.

FIELD OF THE INVENTION

The invention relates to an exoskeleton structure.

STATE OF THE ART

In the military sector, infantrymen are commonly equipped with backpacks allowing them to transport equipment. When infantrymen carry out extended missions, the weight of the backpack can reach 50 kilograms. The weight of the backpack can greatly reduce the mobility of the infantryman and generate a higher metabolic expenditure.

In addition, the backpack generally rests on the shoulders or on the hips of the user, which can generate musculoskeletal disorders in the shoulders, skin pressure, or even cause peripheral neurological symptoms by nerve compression (tingling).

Current solutions consist in distributing the weight of the backpack both on the shoulders using suspenders and on the hips using a waist belt. However, these solutions do not completely relieve the user.

Force-assistance exoskeletons are mechanical structures that double the structure of the human skeleton and that help improve the physical capabilities of the human body.

Some exoskeleton structures have been proposed which allow the weight of the backpack to rest on the ground.

However, known exoskeleton structures (sometimes called "walking robots") generate a very significant bulk and reduce the mobility of the user.

SUMMARY OF THE INVENTION

A purpose of the invention is to provide a solution to allow a user to be relieved of a large part of the weight of his backpack, without reducing the mobility of the shoulders, trunk and pelvis of the user while walking or running.

This purpose is achieved in the context of the present invention thanks to an exoskeleton structure comprising:
  a pelvis assembly comprising a belt capable of surrounding the pelvis of a user to attach the pelvis assembly to the pelvis of the user,
  a first lower limb assembly capable of being fastened to a first lower limb of the user,
  a first pivot link connecting the first lower limb assembly to the pelvis assembly, the first pivot link allowing rotation of the first lower limb assembly relative to the pelvis assembly during an abduction or adduction movement of the first lower limb,
  a second lower limb assembly capable of being fastened to a second lower limb of the user,
  a second pivot link connecting the second lower limb assembly to the pelvis assembly, the second pivot link allowing rotation of the second lower limb assembly relative to the pelvis assembly during an abduction or adduction movement of the second lower limb,
  a back assembly comprising a harness capable of being attached to the user's chest,
  a spinal column mechanism linking the back assembly to the pelvis assembly,
  a third pivot link connecting the spinal column mechanism to the pelvis assembly, the third pivot link allowing rotation of the pelvis assembly relative to the back assembly, during a relative movement of lateral inclination of the user's spine relative to the user's pelvis,
  a third limb member capable of generating a third torque tending to oppose the rotation of the pelvis assembly relative to the back assembly during the relative movement of lateral inclination of the spine relative to the pelvis, and
  wherein the spinal column mechanism comprises a fourth pivot link allowing rotation of the back assembly relative to the pelvis assembly, during a twisting movement of the spine.

The proposed exoskeleton structure allows the load exerted on the back assembly to be transferred to the first lower limb assembly and to the second lower limb assembly, while being compatible with the degrees of freedom of the pelvis, the spine (that is to say of the spinal column) and shoulders that are stressed during walking or running.

The degrees of mobility provided by the first pivot link, the second pivot link and the third pivot link allow designing a structure in which the load is transferred alternately to the first lower limb of the user then to the second lower limb of the user, while walking or running.

Particularly, the third pivot link allows the spinal column mechanism to oscillate relative to the pelvis assembly (oscillation movement that occurs naturally during walking or running), while the third member opposes the torque generated by the load and exerted on the back assembly due to the presence of the third pivot link. The third member thus allows preventing this torque from being transferred to the user's spine.

Furthermore, the fourth pivot link allows an alternative twisting movement of the spine which accompanies the movement of the back relative to the pelvis.

The proposed exoskeleton structure can further have the following features:
  the exoskeleton structure comprises a first member capable of generating a first torque tending to oppose the rotation of the first lower limb assembly relative to the pelvis assembly during an adduction movement of the first lower limb,
  the exoskeleton structure comprises a second member capable of generating a second torque tending to oppose the rotation of the second lower limb assembly relative to the pelvis assembly during an adduction movement of the second lower limb,
  the first member or the second member or the third member comprises an elastic return element between the first lower limb assembly or the second lower limb assembly or the back assembly and the pelvis assembly, the elastic return element generating a return force tending to oppose the rotation of the first lower limb assembly or the second lower limb assembly or the back assembly relative to the pelvis assembly,
  the elastic return element comprises a spiral-shaped part having a first end linked to the pelvis assembly and a second end, opposite the first end, capable of being stressed by the first lower limb assembly or the second lower limb assembly or the back assembly when the first lower limb assembly or the second lower limb assembly or the back assembly is rotated relative to the pelvis assembly, the exoskeleton structure comprises a first abutment capable of being fastened on the pelvis assembly so that in a first angular range of rotation of the first lower limb assembly or the second lower limb assembly relative to the pelvis assembly, the elastic return element abuts against the first abutment and exerts, via the first abutment, on the first lower limb assembly or the second lower limb assembly a return force tending to oppose the adduction movement of the lower limb, and in a second angular range, the elastic return element is no longer in abutment against the first abutment and no longer exerts a return force on the lower limb assembly, the exoskeleton structure comprises means for adjusting the position of the first abutment relative to the pelvis assembly, allowing to adjust a transition angle between the first angular range and the second angular range, the means for adjusting the position of the first abutment comprise an opening and a pin slidably mounted inside the opening, the exoskeleton structure, a second abutment fastened on the lower limb assembly and capable of stressing the elastic return element to exert an elastic preload on the elastic return element, the exoskeleton structure comprises means for adjusting the position of the second abutment relative to the lower limb assembly, the spinal column mechanism comprises a lower part of the spinal column linked to the pelvis assembly via the third pivot link and an upper part of the spinal column linked to the back assembly via a fifth ball joint connection allowing rotation of the back assembly relative to the spinal column mechanism during a lateral inclination movement and during a bending/stretching movement of the user's spine, the upper part of the spinal column is capable of sliding longitudinally relative to the lower part of the spinal column, the spinal column mechanism further comprising an elastic return member capable of generating an elastic return force tending to oppose the sliding of the upper part of the spinal column relative to the lower part of the spinal column during vertical compression of the user's spine, the damping device comprises a cylinder and a piston capable of sliding inside the cylinder, one of the piston and the cylinder being mounted stationary relative to the upper part of the spinal column and the other one of the piston and the cylinder being mounted stationary relative to the lower part of the spinal column, the upper part of the spinal column is linked to the lower part of the spinal column by the fourth pivot link allowing rotation of the upper part of the spinal column relative to the lower part of the spinal column about a longitudinal axis of the spinal column mechanism during the twisting movement of the user's spine, the exoskeleton structure comprises adjustment means allowing adjustment of a distance between the first pivot link and the second pivot link, the adjustment means comprise one or more opening(s) and one or more pin(s) slidably mounted inside the opening(s).

PRESENTATION OF THE DRAWINGS

Figure 2:
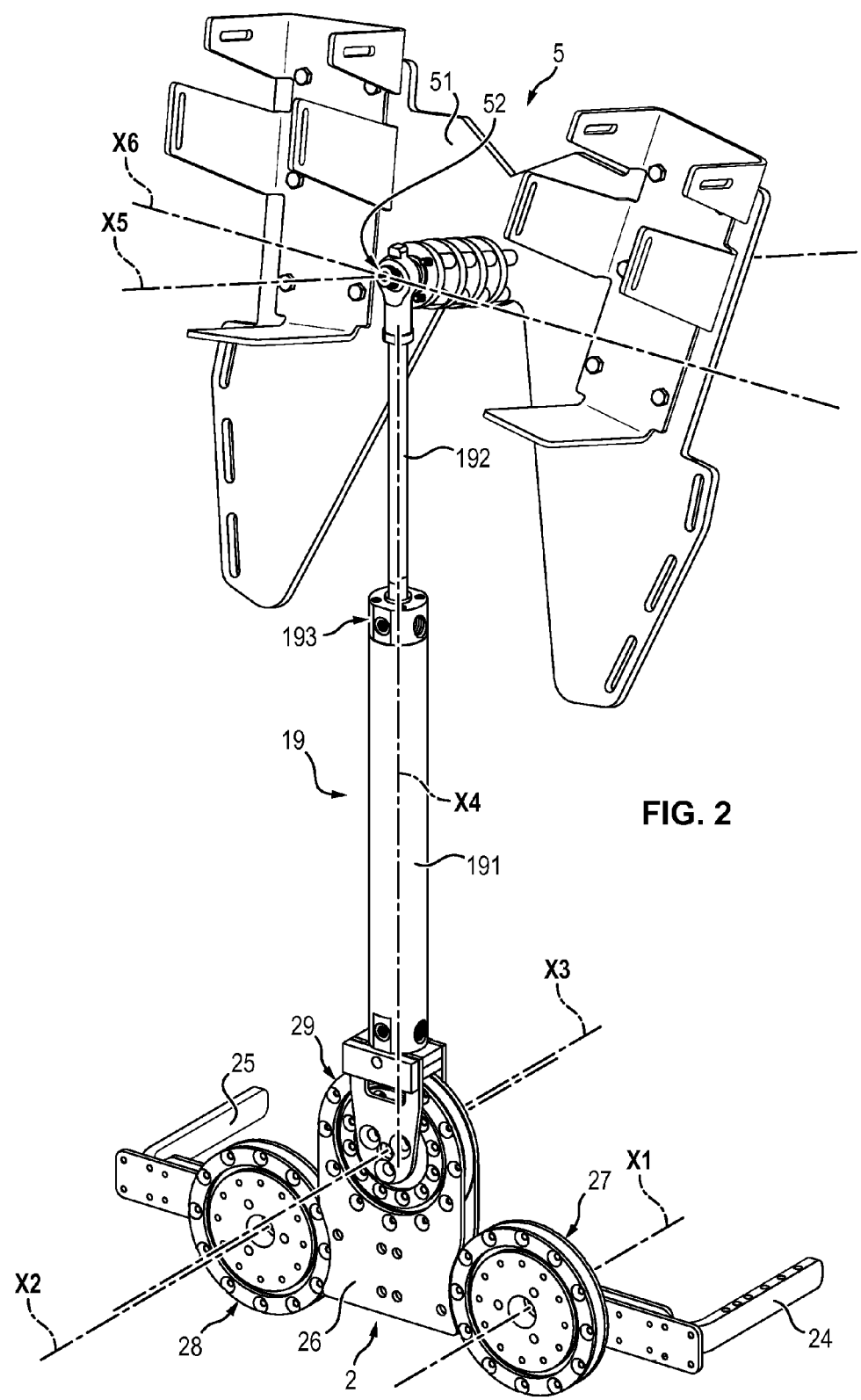
Figure 3:
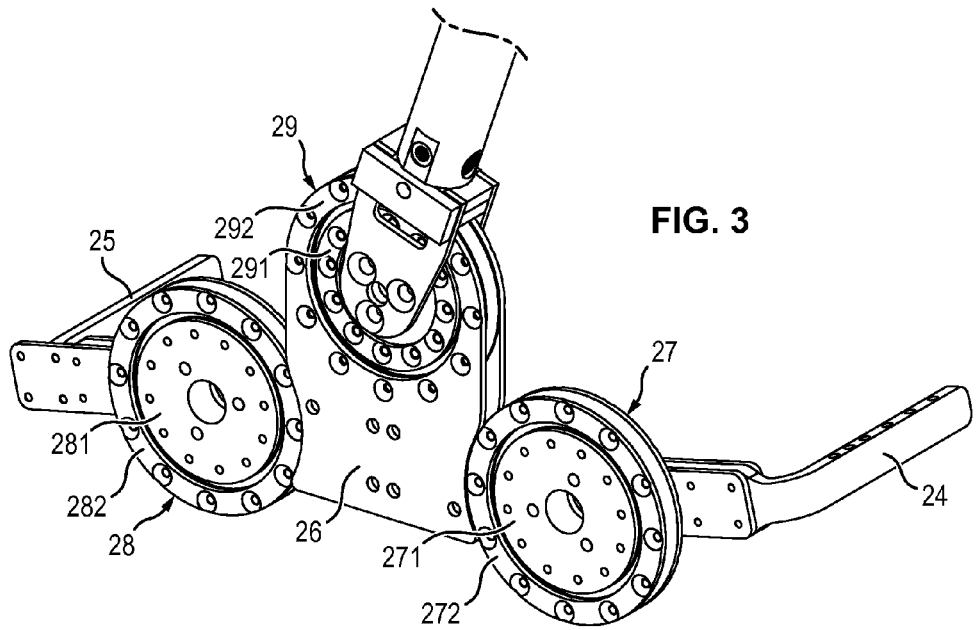
Figure 4:
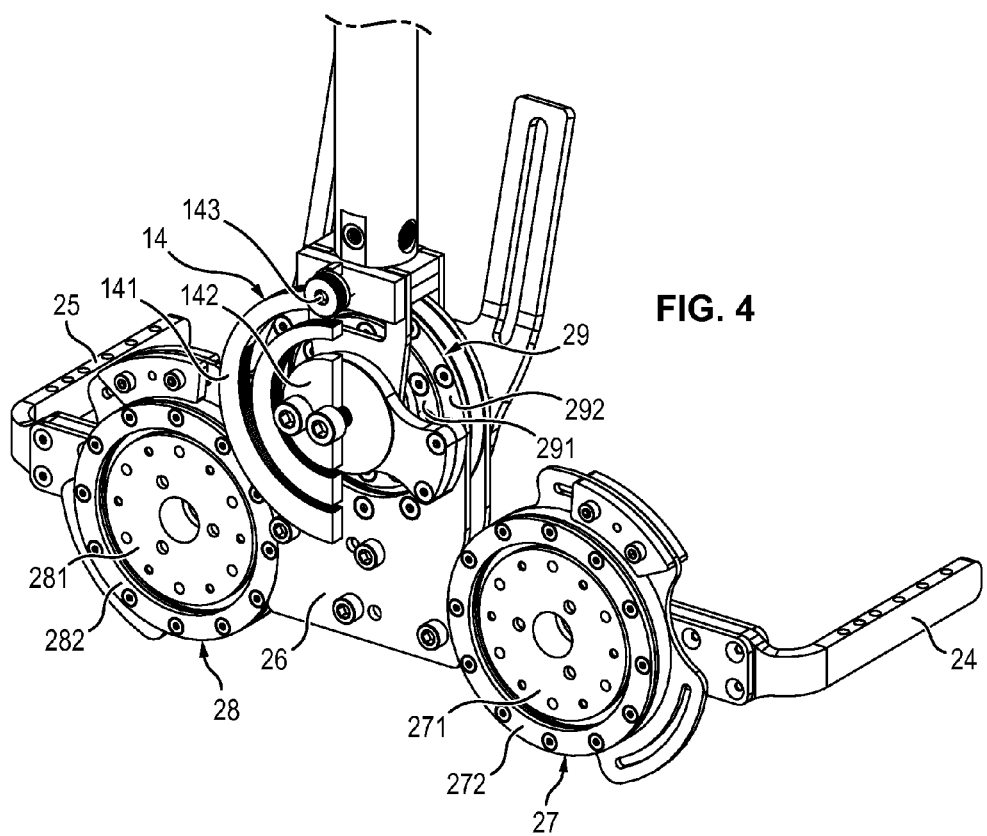
Figure 5:
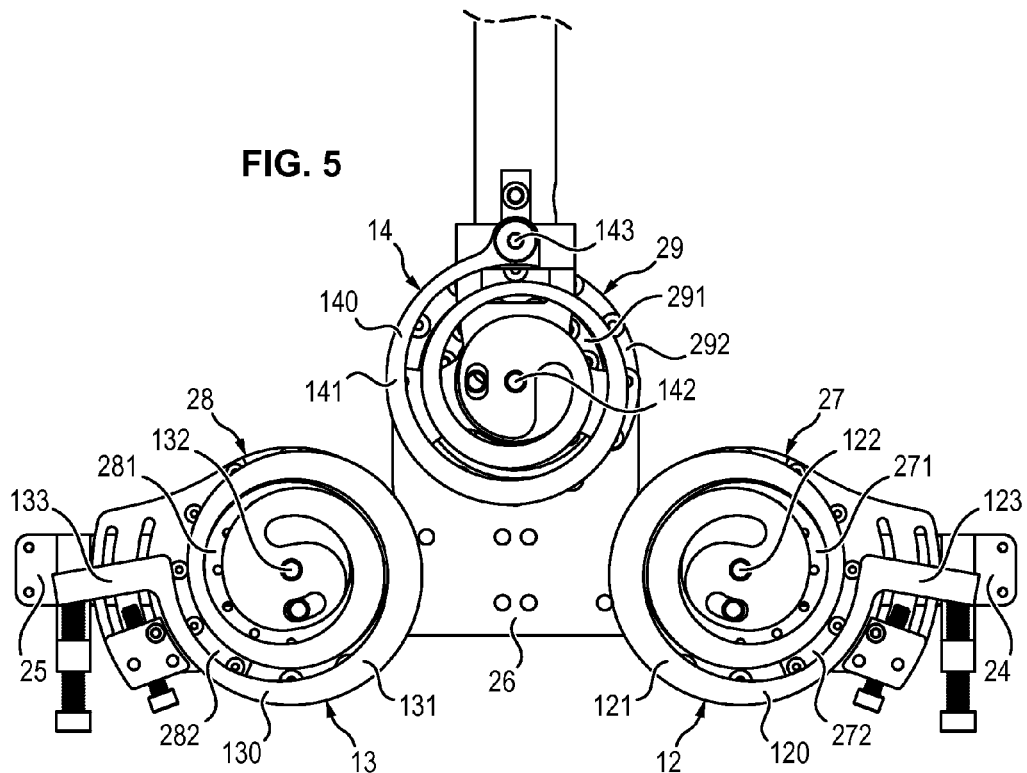
Figure 6:
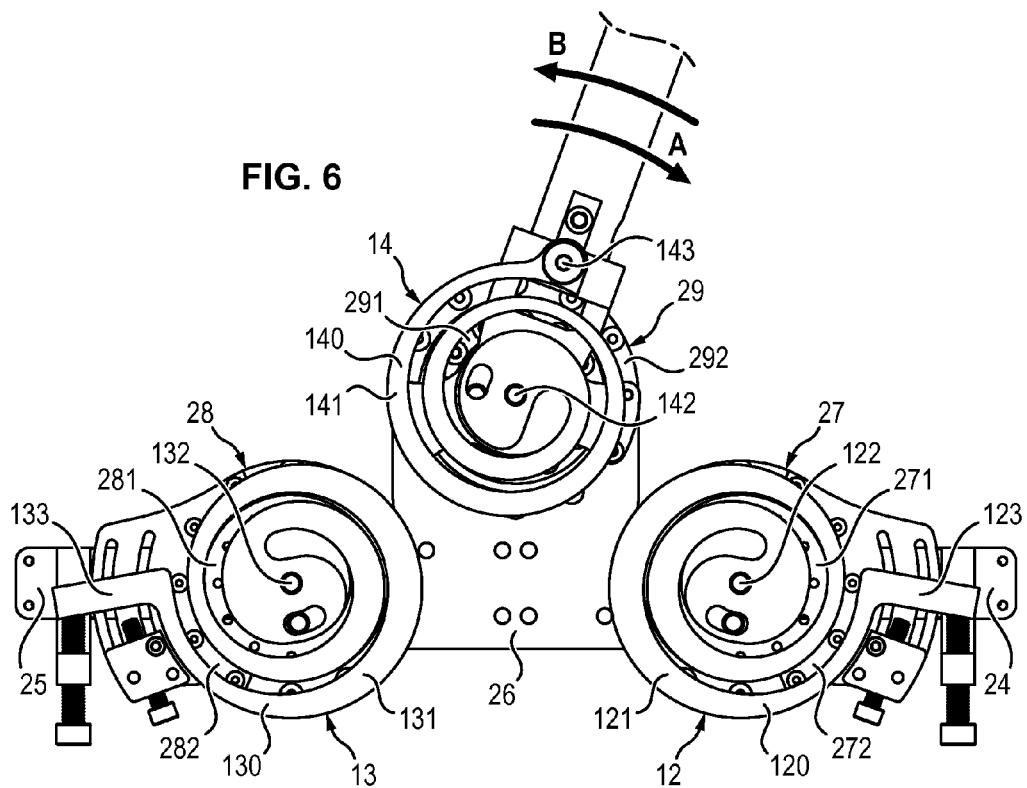
Figure 7:
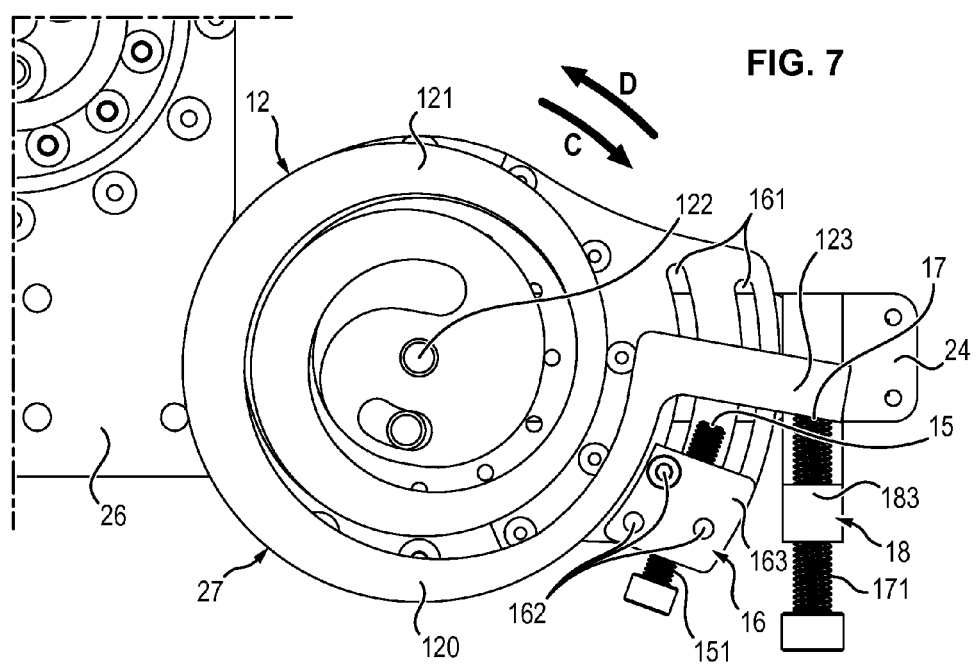
Figure 8:
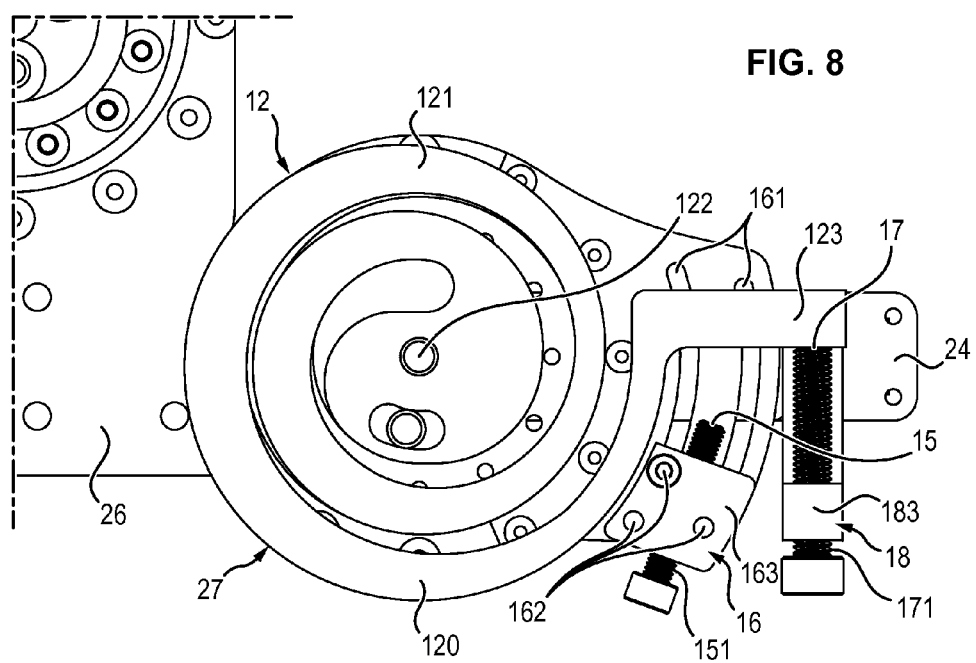
Figure 9:
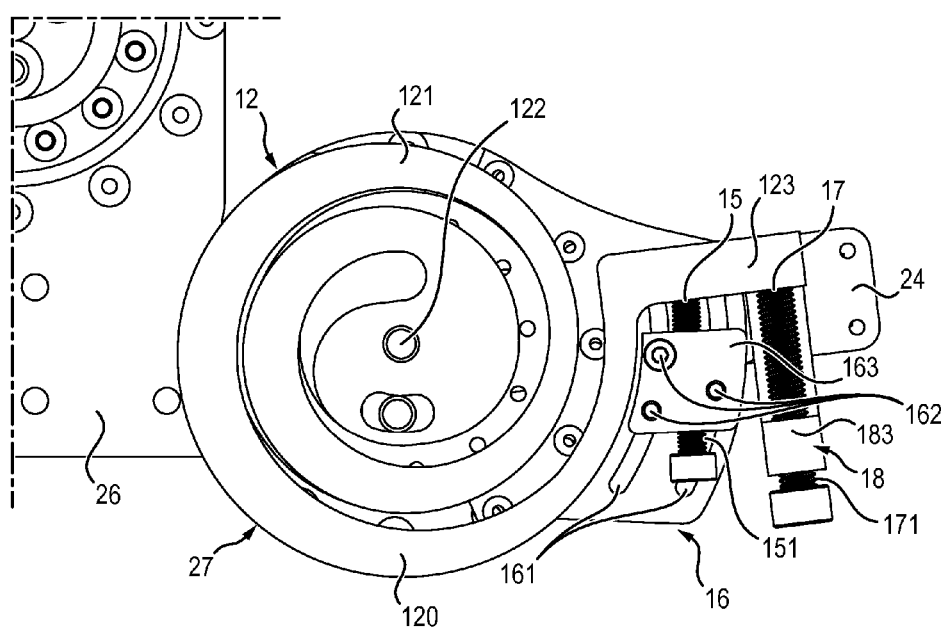
Figure 10:
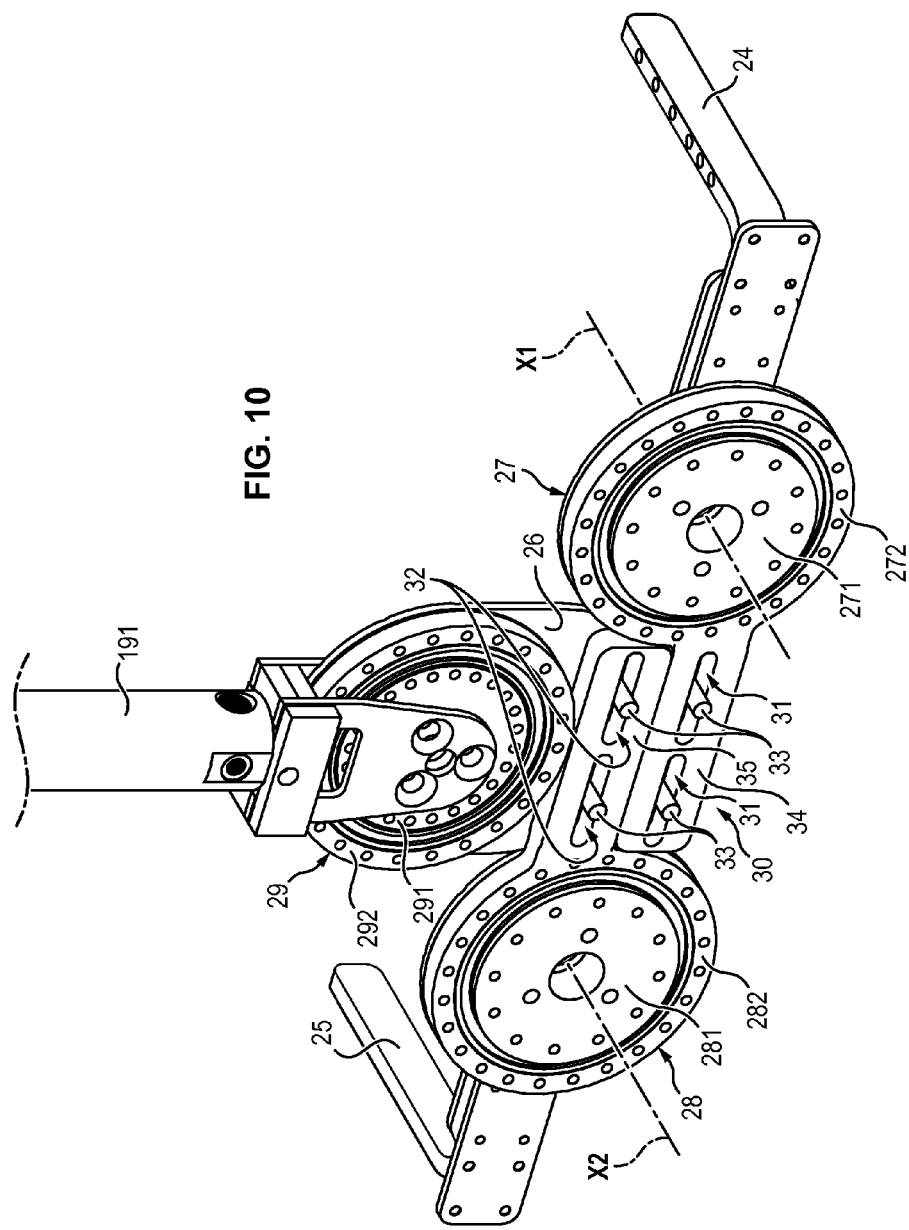

Other features and advantages of the invention will emerge from the following description, which is purely illustrative and not limiting, and should be read with reference to the appended figures, among which:

FIG. 1 schematically shows, in a front view, an exoskeleton structure in accordance with an embodiment of the invention, FIG. 2 schematically shows a rear portion of the exoskeleton structure of FIG. 1, FIGS. 3 and 4 schematically shows the first pivot link, the second pivot link and the third pivot link of the exoskeleton structure, FIG. 5 schematically shows the first pivot link, the second pivot link and the third pivot link of the exoskeleton structure, when the third pivot link is in the initial position, FIG. 6 schematically shows the first pivot link, the second pivot link and the third pivot link of the exoskeleton structure, when the third pivot link is in the inclined position, FIGS. 7 to 9 schematically show the first pivot link, the first torque generation member, a preload adjustment mechanism and an associated abutment position adjustment mechanism, FIG. 10 schematically shows means for adjusting the distance between the first pivot link and the second pivot link.

DETAILED DESCRIPTION OF AN EMBODIMENT

In FIG. 1, the exoskeleton structure 1 shown comprises a pelvis assembly 2, a first lower limb assembly 3, a second lower limb assembly 4, a back assembly 5, a first upper limb assembly 6 and a second upper limb assembly 7.

The pelvis assembly 2 comprises a lumbar belt 21 capable of surrounding the pelvis of a user to attach the pelvis assembly to the pelvis of the user. The pelvis assembly 2 can further comprise a control unit 22 and a battery 23, fastened to the lumbar belt 21. The control unit 22 is configured to control different actuators of the exoskeleton structure 1. The battery 23 is capable of supplying the various actuators with electrical energy.

The first lower limb assembly 3 is capable of being fastened to a first lower limb of the user, for example to the right lower limb (or right leg). The first lower limb assembly 3 may comprise fastening straps for fastening the first lower limb assembly 3 to the first lower limb.

The second lower limb assembly 4 is capable of being fastened to a second lower limb of the user, for example to the left lower limb (or left leg). The second lower limb assembly 4 may comprise fastening straps for fastening the second lower limb assembly 4 to the second lower limb. The second lower limb assembly 4 is symmetrical with the first lower limb assembly 3, relative to a sagittal plane S of the user when the user is in the anatomical reference position.

"Anatomical reference position" means the position of the user when he is standing on a horizontal ground, the arms hanging along the body, the forearms and hands in supination, according to the anatomical reference system. The sagittal plane S is the plane which separates the left half from the right half of the body.

The first upper limb assembly 6 is capable of being fastened to a first upper limb of the user, for example to the right upper limb (or right arm). The first upper limb assembly 6 comprises fastening straps for fastening the first upper limb assembly 6 to the first upper limb.

The second upper limb assembly 7 is capable of being fastened to a second upper limb of the user, for example to the left upper limb (or left arm). The second upper limb assembly 6 comprises fastening straps for fastening the second upper limb assembly 6 to the second upper limb.

The back assembly 5 comprises a harness 53 capable of being attached to the user's chest. To this end, the harness 53 may comprise a set of straps allowing to attach the back assembly 5 to the chest.

The exoskeleton structure 1 further comprises a first hip joint 8 linking the first lower limb assembly 3 to the pelvis assembly 2 and a second hip joint 9 linking the second lower limb assembly 4 to the pelvis assembly 2.

The exoskeleton structure 1 further comprises a first shoulder joint 10 linking the first upper limb assembly 6 to the back assembly 5 and a second shoulder joint 11 linking the second upper limb assembly 7 to the back assembly 5.

As illustrated in FIG. 2, the exoskeleton structure 1 further comprises a spinal column mechanism 19 extending along the user's spine. The spinal column mechanism 19 links the back assembly 5 to the pelvis assembly 2. The spinal column mechanism 19 allows transferring a load acting on the back assembly 5 to the pelvis assembly 2, for example the weight of a backpack.

The pelvis assembly 2 comprises a first hip part 24, a second hip part 25, a pelvis part 26, a first pivot link 27, a second pivot link 28 and a third pivot link 29.

The pelvis part 26 is fastened to the lumbar belt 21.

The first hip part 24 is connected at one of its ends to the first lower limb assembly 3 via the first hip joint 8 and at the other of its ends to the pelvis part 26 via the first pivot link 27. The first pivot link 27 allows rotation of the first lower limb assembly 3 relative to the pelvis assembly 2 during an abduction or adduction movement of the first lower limb. To this end, the first pivot link 27 allows rotation of the first hip part 24 relative to the pelvis part 26 about a first axis of rotation X1 which is horizontal and parallel to the sagittal plane of the user, when the user is in the anatomical reference position.

The second hip part 25 is connected at one of its ends to the second lower limb assembly 4 via the second hip joint 9 and at the other of its ends to the pelvis part 26 via the second pivot link 28. The second pivot link 28 allows rotation of the second lower limb assembly 4 relative to the pelvis assembly 2 during an abduction or adduction movement of the second lower limb. To this end, the second pivot link 28 allows rotation of the second hip part 25 relative to the pelvis part 26 about a second axis of rotation X2 which is horizontal and parallel to the sagittal plane of the user, when the user is in the anatomical reference position. The second axis of rotation X2 is parallel to the first axis of rotation X1.

The spinal column mechanism 19 comprises a lower part 191 of the spinal column, an upper part 192 of the spinal column and a fourth pivot link 193.

The lower part 191 of the spinal column is linked to the pelvis assembly 2 via the third pivot link 29. The third pivot link 29 allows rotation of the pelvis assembly 2 relative to the back assembly 5, during a lateral inclination movement of the pelvis of the user relative to the spine of the user. To this end, the third pivot link 29 allows rotation of the pelvis part 26 relative to the lower part 191 of the spinal column about a third axis of rotation X3, which is horizontal and parallel to the sagittal plane of the user, when the user is in the anatomical reference position. The third axis of rotation X3 is parallel to the first axis of rotation X1 and to the second axis of rotation X2.

The upper part 192 of the spinal column is slidably mounted relative to the lower part 191 of the spinal column along a longitudinal axis X4 of the spinal column mechanism 19. Furthermore, the fourth pivot link 193 allows rotation of the back assembly 5 relative to the pelvis assembly 2 during a twisting movement of the spine of the user. To this end, the fourth pivot link 193 allows rotation of the upper part of the spinal column 192 relative to the lower part 191 of the spinal column about the longitudinal axis X4.

The spinal column mechanism 19 further comprises an elastic return member capable of generating an elastic return force opposing the sliding of the upper part 192 of the spinal column relative to the lower part 191 of the spinal column. More specifically, the elastic return member is capable of exerting on the upper part 192 of the spinal column a return force proportional to the relative displacement of the upper part 192 of the spinal column relative to the lower part 191 of the spinal column during axial compression of the spine. The elastic return member may comprise a cylinder and a piston capable of sliding inside the cylinder, one of the piston and the cylinder being mounted stationary relative to the upper part 192 of the spinal column and the other one of the piston and the cylinder being mounted stationary relative to the lower part 191 of the spinal column. The piston and the cylinder delimit a chamber containing pressurized air (that is to say one whose pressure is higher than the atmospheric pressure). When the upper part 192 of the spinal column is axially displaced relative to the lower part of the spinal column 191 tending to compress the spine, the air contained in the chamber is compressed by the piston. As a result, the compressed air exerts on the piston the return force tending to oppose the compression of the spine. The stiffness of the elastic return member can be adjusted by varying the amount of air present in the chamber and/or the volume of the chamber. It also allows adjusting the length of the spinal column mechanism based on the size of the user.

The back assembly 5 comprises a support part 51 on which a load to be carried, for example a backpack, can be fastened, and a fifth ball joint connection 52.

The upper part 192 of the spinal column is connected to the support part 51 via the fifth ball joint connection 52. The fifth ball joint connection 52 allows on the one hand, a rotation of the back assembly 5 relative to the pelvis assembly 2 during a movement of lateral inclination of the user's shoulders relative to the spine. To this end, the fifth ball joint connection 52 allows rotation of the support part 51 relative to the upper part of the spinal column 192 about a fifth axis of rotation X5. The fifth axis of rotation X5 is horizontal and parallel to the sagittal plane of the user, when the user is in the anatomical reference position. Thus, the fifth axis of rotation X5 is parallel to the third axis of rotation X3 when the user is in the anatomical reference position.

The fifth ball joint connection 52 also allows rotation of the back assembly 5 relative to the pelvis assembly 2 during a bending/stretching movement of the user's spine. To this end, the fifth ball joint connection 52 allows rotation of the support part 51 relative to the upper part 192 of the spinal column about a sixth axis of rotation X6. The sixth axis of rotation X6 is horizontal and perpendicular to the sagittal plane of the user, when the user is in the anatomical reference position.

FIGS. 3 and 4 illustrate in more detail the first pivot link 27, the second pivot link 28 and the third pivot link 29.

The first pivot link 27 comprises a first rotor 271 and a first stator 272. The first rotor 271 is fixedly mounted on the first hip part 24. The first stator 272 is fixedly mounted on the pelvis part 26.

The second pivot link 28 comprises a second rotor 281 and a second stator 282. The second rotor 281 is fixedly mounted on the second hip part 25. The second stator 282 is fixedly mounted on the pelvis part 26.

The third pivot link 29 comprises a third rotor 291 and a third stator 292. The third rotor 291 is fixedly mounted on the lower part 191 of the spinal column. The second stator 292 is fixedly mounted on the pelvis part 26.

Moreover, the exoskeleton structure 1 comprises a first member 12 capable of generating a first torque tending to oppose the rotation of the first rotor 271 relative to the first stator 272 during an abduction or adduction movement of the first lower limb.

The exoskeleton structure 1 also comprises a second member 13 capable of generating a second torque tending to oppose the rotation of the second rotor 281 relative to the second stator 282 during an abduction or adduction movement of the second lower limb.

The exoskeleton structure also comprises a third member 14 capable of generating a third torque tending to oppose the rotation of the third rotor 291 relative to the third stator 292 during the lateral inclination movement of the pelvis.

The first member 12, the second member 13 or the third member 14 may be an active member (that is to say an actuator requiring an electrical energy supply to generate the first torque, such as an electric motor for example) or a passive member (that is to say one which does not require an electrical energy supply, such as a spring for example).

In the example illustrated in FIGS. 4 to 6, the third member 14 comprises one or more elastic return element(s) 141 linking the back assembly 5 to the pelvis assembly. A rotation of the pelvis assembly 2 relative to the back assembly 5 results in a deformation of the elastic return element(s) 141, this deformation having the effect that the elastic return element 141 generates a return torque tending to oppose this rotation.

In the example illustrated in FIGS. 4 to 6, the elastic return element 141 comprises a spiral-shaped part 140 having a first end 142 (at the center of the spiral) linked to the pelvis assembly 2 and a second end 143 (remote from the center of the spiral), opposite the first end 142, linked to the spinal column mechanism 19. More specifically, the first end 142 is fastened to the third stator 292 and the second end 143 is fastened to the third rotor 291.

FIG. 5 shows the elastic return element 141 when the user is in the anatomical reference position. In this position, the elastic return element 141 exerts no torque.

FIG. 6 shows the elastic return element 141 when the user laterally inclines the spine relative to the pelvis. The spiral-shaped part 140 is arranged so that a rotation of the back assembly 5 relative to the pelvis assembly 2 in a first direction (arrow A) causes the spiral-shaped part 140 to be wound, and the rotation of the back assembly 5 relative to the pelvis assembly 2 in a second direction (arrow B), opposite to the first direction, causes the spiral-shaped part 140 to be unwound.

FIGS. 7 to 9 illustrate in more detail the first pivot link 27.

In the example illustrated in FIGS. 7 to 9, the first member 12 comprises an elastic return element 121 linking the first lower limb assembly 3 to the pelvis assembly 2. A rotation of the first lower limb assembly 3 relative to the pelvis assembly 2 results in a deformation of the elastic element 121, the deformation having the effect that the elastic return element 121 generates a return torque tending to oppose this rotation.

In the example illustrated in FIGS. 7 to 9, the elastic return element 121 comprises a spiral-shaped part 120 having a first end 122 (at the center of the spiral) connected to the pelvis assembly 2 and a second end 123 (remote from the center of the spiral), opposite the first end 122, and capable of being stressed by the first lower limb assembly 3 during a relative rotation of the pelvis assembly 2 relative to the first lower limb assembly 3. More specifically, the first end 122 is fastened to the first rotor 271, integral with the first hip part 24.

FIG. 7 shows the elastic return element 121 when the user is in the anatomical reference position. In this position, the elastic return element 121 exerts no torque.

During an abduction or adduction movement of the first lower limb, the first lower limb assembly 3 is driven in rotation relative to the pelvis assembly 2. This has the effect of deforming the elastic return element 121 so that the elastic return element 121 generates a return torque tending to oppose this rotation.

The spiral-shaped part 120 is arranged so that a rotation of the lower limb assembly 3 relative to the pelvis assembly 2 in a first direction of rotation corresponding to an adduction movement (arrow C) causes the spiral-shaped part 120 to be wound, and the rotation of the lower limb assembly 3 relative to the pelvis assembly 2 in a second direction corresponding to an abduction movement (arrow D), opposite to the first direction causes the spiral-shaped part 120 to be unwound.

Moreover, the exoskeleton structure 1 comprises a first abutment 15 capable of being fastened on the pelvis assembly 2 so that:
  in a first angular range of rotation of the first lower limb assembly 3 relative to the pelvis assembly 2, the elastic return member 121 abuts against the first abutment 15 and exerts, via the first abutment 15, on the first lower limb assembly 3 a return force tending to oppose the adduction movement of the lower limb, and
  in a second angular range, the elastic return member 121 is no longer in abutment against the first abutment 15 and no longer exerts a return force on the lower limb assembly.

The first abutment 15 may comprise a screw 151 fastened to the pelvis part 26 so that the end of the screw 151 stresses the second end 123 of the spiral-shaped part 120 only in the first angular range.

The exoskeleton structure 1 further comprises adjustment means 16 allowing adjusting the position of the first abutment 15 relative to the pelvis assembly 2. The adjustment means 16 comprise one or more opening(s) 161 stationary relative to the pelvis part 26 and one or more pin(s) 162 slidably mounted inside the opening(s) 161. More specifically, the adjustment means 16 comprise a first adjustment part 163 having a through orifice having an inner thread. The screw 151 is screwed into the orifice. The pins 162 are fixedly mounted on the first adjustment part 163. The position of the first adjustment part 163 can be modified by sliding the pins 162 in the openings 161. The openings 161 can be formed in the stator 272 of the first pivot link 27. In the example illustrated in FIGS. 7 to 9, the adjustment means 16 comprise two openings 161 and three pins 162 slidably mounted inside the openings 161 to guide the displacement of the first adjustment part 163 relative to the pelvis part 26. The pins 162 can be constituted by screws.

As illustrated in FIG. 9, the adjustment means 16 allow modifying the limit between the first and the second angular range, by adjusting the position of the adjustment part 163 relative to the pelvis assembly 2 and by adjusting the position of the screw 151 in the threaded orifice.

The exoskeleton structure 1 further comprises a second abutment 17 fastened on the first lower limb assembly 3 and capable of stressing the elastic return member 121 so as to exert an elastic preload on the elastic return member 121.

The second abutment 17 may comprise a screw 171 fastened to the hip part 24 so that the end of the screw 171 permanently stresses the second end 123 of the spiral-shaped part 120.

The exoskeleton structure 1 further comprises means 18 for adjusting the position of the second abutment 17 relative to the first lower limb assembly 3. The adjustment means 18 comprise a second adjustment part 183 fixedly mounted on the first hip part 24. The second adjustment part 183 has a through orifice having an inner thread. The screw 171 is screwed into the orifice.

As illustrated in FIG. 8, the adjustment means 18 allow modifying the preload exerted on the elastic return member 121, by adjusting the position of the screw 171 in the threaded orifice.

It should be noted that the second pivot link 28 comprises parts similar to those of the first pivot link 27, the parts of the second pivot link 28 being arranged symmetrically with the parts of the first pivot link 27 relative to the sagittal plane of the user. Particularly, the exoskeleton structure 1 comprises a second elastic return member 131, arranged symmetrically with the first elastic return member 121, as well as a first abutment and a second abutment.

The elastic return member 131 comprises a spiral-shaped part 130 having a first end 132 (at the center of the spiral) connected to the pelvis assembly 2 and a second end 133 (remote from the center of the spiral), opposite the first end 132, and capable of being stressed by the second lower limb assembly 4 during a relative rotation of the pelvis assembly 2 relative to the second lower limb assembly 4. More specifically, the first end 132 is fastened to the second rotor 281, integral with the second hip part 25.

As illustrated in FIG. 10, the exoskeleton structure 1 further comprises adjustment means 30 allowing adjustment of the distance between the first axis of rotation X1 and the second axis of rotation X2.

In the example illustrated in FIG. 10, the adjustment means 30 comprise one or more opening(s) 31 stationary relative to the stator 272 of the first pivot link 27, one or more opening(s) 32 stationary relative to the stator 282 of the second pivot link 28, and one or more pin(s) 33 mounted stationary relative to the pelvis part 26. The pin(s) 33 is (are) slidably mounted inside the openings 31 and 32. More specifically, the adjustment means 30 comprise a first adjustment part 34 fastened to the first stator 272. The first adjustment part 34 has two horizontal openings 31. Likewise, the adjustment means 30 comprise a second adjustment part 35 fastened to the second stator 282. The second adjustment part 35 also has two horizontal openings 32. The adjustment means 30 comprise two first pins 33 fastened to the pelvis part 26, each of the first pins being able to slide inside a respective first opening 31 to displace the first pivot link 27 relative to the pelvis assembly 2 in a direction perpendicular to the axes X1 and X2. The adjustment means 30 comprise two second pins 33 fastened to the pelvis part 26, each of the second pins being able to slide inside a respective second opening 32 to displace the second pivot link 28 relative to the pelvis assembly 2 in a direction perpendicular to the axes X1 and X2.

The adjustment means 30 thus allow adjusting the spacing between the axes of rotation X1 and X2, so that these axes are aligned with the femoral heads of the user, so as to correspond to the axes of abduction/adduction of the user's hips.

Finally, the exoskeleton structure 1 can also comprise damping devices disposed in parallel with the pivot link 27, 28, 29, 193 and the ball joint connection 52 to dampen the movement of the different parts relative to each other. In the case where the members 12, 13 and 14 are active members, such as electric motors for example, these members can act as damping devices for the pivot links 27, 28 and 29.

In operation, when the user is walking, the user alternately leans on his first lower limb (right leg) and on his second lower limb (left leg), which causes a slight oscillation of the spinal column mechanism 19 relative to the pelvis assembly 2.

During a first phase of the walking cycle, when the user leans on his first lower limb (right leg), the load generated by the weight of the backpack has the effect of lowering the pelvis on the left side. The lower part 191 of the spinal column consequently tends to pivot relative to the pelvis part 26, in the first direction of rotation (arrow A), about the third axis of rotation X3.

Rotating the lower part of the spinal column 191 in the first direction has the effect of deforming the third elastic return member 141, which generates a torque tending to drive the pelvis assembly 2 in rotation relative to the first lower limb assembly 3 (in the direction of arrow C) and relative to the second lower limb assembly 4.

The action of the first elastic return member 121 and the second elastic return member 131 has the effect that the entire load or a portion of the load generated by the weight of the backpack acting on the back assembly 5 is transferred by the first elastic return member 121 to the first lower limb assembly 3 via the first hip part 24 and the first hip joint 8.

Conversely, the fraction of the load transmitted to the second lower limb assembly 4 is greatly reduced, which allows the user to be able to lift his second lower limb from the ground without exerting excessive force.

During a second phase of the walking cycle, when the user leans on his second lower limb (left leg), the load generated by the weight of the backpack has the effect of lowering the pelvis on the right side. The lower part 191 of the spinal column tends to pivot relative to the pelvis part 26, in the second direction of rotation (arrow B), opposite to the first direction of rotation, about the third axis of rotation X3.

The rotation of the lower part 191 of the spinal column in the second direction has the effect of deforming the third elastic return member 121, which generates a torque tending to cause the pelvis assembly 2 to rotate relative to the first lower limb assembly 3 (in the direction of arrow D) and relative to the second lower limb assembly 4, in the opposite direction.

The action of the first elastic return member 121 and the second elastic return member 131 has the effect that the entire load or a portion of the load generated by the weight of the backpack acting on the back assembly 5 is transferred by the second elastic return member 131 to the second lower limb assembly 4 via the second hip part 25 and the second hip joint 9.

Conversely, the fraction of the load transmitted to the first lower limb assembly 3 is greatly reduced, which allows the user to be able to lift his first lower limb from the ground without exerting excessive force.

During the walking cycle, the load is thus transferred alternately to the first lower limb assembly 3 and to the second lower limb assembly 4, without passing through the pelvis of the user. The torque resulting from the deformation of the elastic return members 121 and 131 allows the load to be supported on the side of the ground contact, while the opposite side is released from the load.

Thanks to the arrangement of the three pivot links and the elastic return members, the load is always transferred to the lower limb assembly which is in contact with the ground.

The other lower limb assembly supports only a small fraction of the load so that the user can easily lift the corresponding lower limb.

Moreover, when the user stands motionless, in the anatomical reference position, the first lower limb assembly 3 and the second lower limb assembly 4 of the exoskeleton structure 1 are simultaneously in contact with the ground. In this position, the proposed exoskeleton structure 1 allows the load generated by the weight of the backpack to be shared by distributing it equally over the two lower limb assemblies.

The invention claimed is:

1. An exoskeleton structure comprising:
   a pelvis assembly comprising a belt capable of surrounding a pelvis of a user to attach the pelvis assembly to the pelvis of the user,
   a first lower limb assembly capable of being fastened to a first lower limb of the user,
   a first pivot link connecting the first lower limb assembly to the pelvis assembly, the first pivot link allowing rotation of the first lower limb assembly relative to the pelvis assembly during an abduction movement or an adduction movement of the first lower limb,
   a first member capable of generating a first torque tending to oppose the rotation of the first lower limb assembly relative to the pelvis assembly during the adduction movement of the first lower limb, the first member comprising a first elastic return element between the first lower limb assembly and the pelvis assembly, the first elastic return element generating a first return force tending to oppose the rotation of the first lower limb assembly relative to the pelvis assembly,
   a first abutment capable of being fastened on the pelvis assembly so that in a first angular range of rotation of the first lower limb assembly relative to the pelvis assembly, the first elastic return element abuts against the first abutment and exerts, via the first abutment, on the first lower limb assembly the first return force tending to oppose the adduction movement of the first lower limb, and in a second angular range, the first elastic return element is no longer in abutment against the first abutment and no longer exerts the first return force on the first lower limb assembly,
   means for adjusting a position of the first abutment relative to the pelvis assembly allowing to adjust a transition angle between the first angular range and the second angular range, the means for adjusting the position of the first abutment comprising an opening and a pin slidably mounted inside the opening,
   a second lower limb assembly capable of being fastened to a second lower limb of the user,
   a second pivot link connecting the second lower limb assembly to the pelvis assembly, the second pivot link allowing rotation of the second lower limb assembly relative to the pelvis assembly during an abduction movement or an adduction movement of the second lower limb,
   a back assembly comprising a harness capable of being attached to a chest of the user,
   a spinal column mechanism linking the back assembly to the pelvis assembly,
   a third pivot link connecting the spinal column mechanism to the pelvis assembly, the third pivot link allowing rotation of the pelvis assembly relative to the back assembly, during a relative movement of lateral inclination of a spine of the user relative to the pelvis of the user,
   a second member capable of generating a second torque tending to oppose the rotation of the pelvis assembly relative to the back assembly during the relative movement of lateral inclination of the spine of the user relative to the pelvis of the user,
   wherein the spinal column mechanism comprises a fourth pivot link allowing rotation of the back assembly relative to the pelvis assembly, during a twisting movement of the spine.

2. The exoskeleton structure according to claim 1, comprising a third member capable of generating a third torque tending to oppose the rotation of the second lower limb assembly relative to the pelvis assembly during the adduction movement of the second lower limb.

3. The exoskeleton structure according to claim 2, wherein the second member comprises a second elastic return element between the second lower limb assembly and the pelvis assembly, the second elastic return element generating a second return force tending to oppose the rotation the second lower limb assembly relative to the pelvis assembly.

4. The exoskeleton structure according to claim 1, wherein the first elastic return element comprises a spiral-shaped part having a first end linked to the pelvis assembly and a second end, opposite the first end, capable of being stressed by the first lower limb assembly when the first lower limb assembly is rotated relative to the pelvis assembly.

5. The exoskeleton structure according to claim 1, comprising a second abutment fastened on the first lower limb assembly and capable of stressing the first elastic return element to exert first elastic preload on the first elastic return element.

6. The exoskeleton structure according to claim 5, comprising means for adjusting a position of the second abutment relative to the first lower limb assembly.

7. The exoskeleton structure according to claim 1, wherein the spinal column mechanism comprises a lower part of the spinal column mechanism linked to the pelvis assembly via the third pivot link and an upper part of the spinal column mechanism linked to the back assembly via a ball joint connection allowing rotation of the back assembly relative to the spinal column mechanism during a lateral inclination movement and during a bending/stretching movement of the spine of the user.

8. The exoskeleton structure according to claim 7, wherein the upper part of the spinal column mechanism is capable of sliding longitudinally relative to the lower part of the spinal column mechanism, the spinal column mechanism further comprising an elastic return member capable of generating another return force tending to oppose the sliding of the upper part of the spinal column mechanism relative to the lower part of the spinal column mechanism during vertical compression of the spine of the user.

9. The exoskeleton structure according to claim 8, wherein the elastic return member comprises a cylinder and a piston capable of sliding inside the cylinder, one of the piston and the cylinder being mounted stationary relative to the upper part of the spinal column mechanism and the other one of the piston and the cylinder being mounted stationary relative to the lower part of the spinal column mechanism.

10. The exoskeleton structure according to claim 7, wherein the upper part of the spinal column mechanism is linked to the lower part of the spinal column mechanism by the fourth pivot link allowing rotation of the upper part of the spinal column mechanism relative to the lower part of the spinal column mechanism about a longitudinal axis of the spinal column mechanism during the twisting movement of the spine of the user.

11. The exoskeleton structure according to claim 1, comprising adjustment means allowing adjustment of a distance between the first pivot link and the second pivot link.

12. The exoskeleton structure according to claim 11, wherein the adjustment means comprise one or more openings and one or more pins slidably mounted inside the openings.

13. The exoskeleton structure according to claim 1, further comprising a third member that comprises a third elastic return element between the back assembly and the pelvis assembly, the third elastic return element generating a third return force tending to oppose the rotation of the back assembly relative to the pelvis assembly.

14. The exoskeleton structure according to claim 3, wherein the second elastic return element comprises a spiral-shaped part having a first end linked to the pelvis assembly and a second end, opposite the first end, capable of being stressed by the second lower limb assembly when the second lower limb assembly is rotated relative to the pelvis assembly.

15. An exoskeleton structure comprising:
a pelvis assembly comprising a belt capable of surrounding a pelvis of a user to attach the pelvis assembly to the pelvis of the user, and a pelvis part fastened to the belt,
a first lower limb assembly capable of being fastened to a first lower limb of the user,
a first pivot link connecting the first lower limb assembly to the pelvis assembly, the first pivot link allowing rotation of the first lower limb assembly relative to the pelvis assembly during an abduction or adduction movement of the first lower limb, the first pivot link comprising a first stator and first rotor fixedly mounted to a first hip part,
a second lower limb assembly capable of being fastened to a second lower limb of the user,
a second pivot link connecting the second lower limb assembly to the pelvis assembly, the second pivot link allowing rotation of the second lower limb assembly relative to the pelvis assembly during an abduction or adduction movement of the second lower limb, the second pivot link comprising a second stator and a second rotor fixedly mounted to a second hip part,
adjustment means allowing adjustment of a distance between the first pivot link and the second pivot link, said adjustment means comprising a first adjustment part fastened to the first stator and comprising one or more first openings, a second adjustment part fastened to the second stator and comprising one or more second openings, at least one first pin mounted stationary relative to the pelvis part and slidably mounted inside the one or more first openings, and at least one second pin mounted stationary relative to the pelvis part and slidably mounted inside the one or more second openings,
a back assembly comprising a harness capable of being attached to a chest of the user,
a spinal column mechanism linking the back assembly to the pelvis assembly,
a third pivot link connecting the spinal column mechanism to the pelvis assembly, the third pivot link allowing rotation of the pelvis assembly relative to the back assembly, during a relative movement of lateral inclination of the user's spine relative to the pelvis of the user,
a first member capable of generating a first torque tending to oppose the rotation of the pelvis assembly relative to the back assembly during the relative movement of lateral inclination of a spine of the user relative to the pelvis, and
a second member capable of generating a second torque tending to oppose the rotation of the first lower limb assembly relative to the pelvis assembly during the adduction movement of the first lower limb,
wherein the first member or the second member comprises an elastic return element between the first lower limb assembly or the second lower limb assembly and the pelvis assembly, the elastic return element generating a return force tending to oppose the rotation of the first lower limb assembly or the second lower limb assembly relative to the pelvis assembly,
wherein the exoskeleton structure further comprises a first abutment capable of being fastened on the pelvis assembly so that in a first angular range of rotation of the first lower limb assembly or the second lower limb assembly relative to the pelvis assembly, the elastic return element abuts against the first abutment and exerts, via the first abutment, on the first lower limb assembly or the second lower limb assembly, the return force tending to oppose the adduction movement of the first lower limb, and in a second angular range, the elastic return element is no longer in abutment against the first abutment and no longer exerts the return force, and
wherein the spinal column mechanism comprises a fourth pivot link allowing rotation of the back assembly relative to the pelvis assembly, during a twisting movement of the spine.

16. The exoskeleton structure according to claim 15, comprising a third member capable of generating a third torque tending to oppose the rotation of the second lower limb assembly relative to the pelvis assembly during the adduction movement of the second lower limb.

17. The exoskeleton structure according to claim 15, wherein the elastic return element comprises a spiral-shaped part having a first end linked to the pelvis assembly and a second end, opposite the first end, capable of being stressed by the first lower limb assembly or the second lower limb assembly or the back assembly when the first lower limb assembly or the second lower limb assembly or the back assembly is rotated relative to the pelvis assembly.

* * * * *